April 1, 1947. R. R. HAYS 2,418,407
CONTROL MEANS FOR HELICOPTERS
Filed Aug. 14, 1943 3 Sheets-Sheet 1
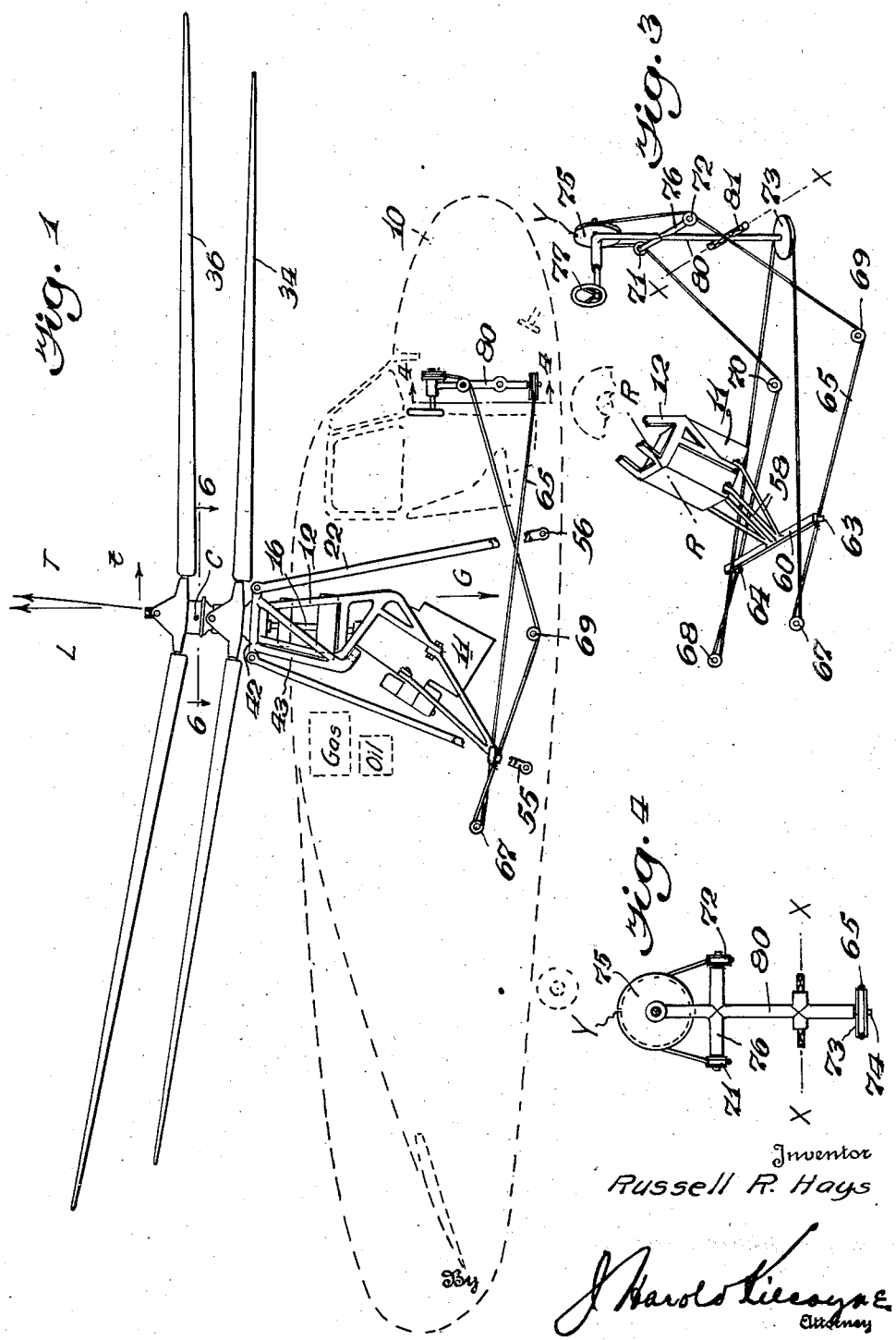
Inventor
Russell R. Hays

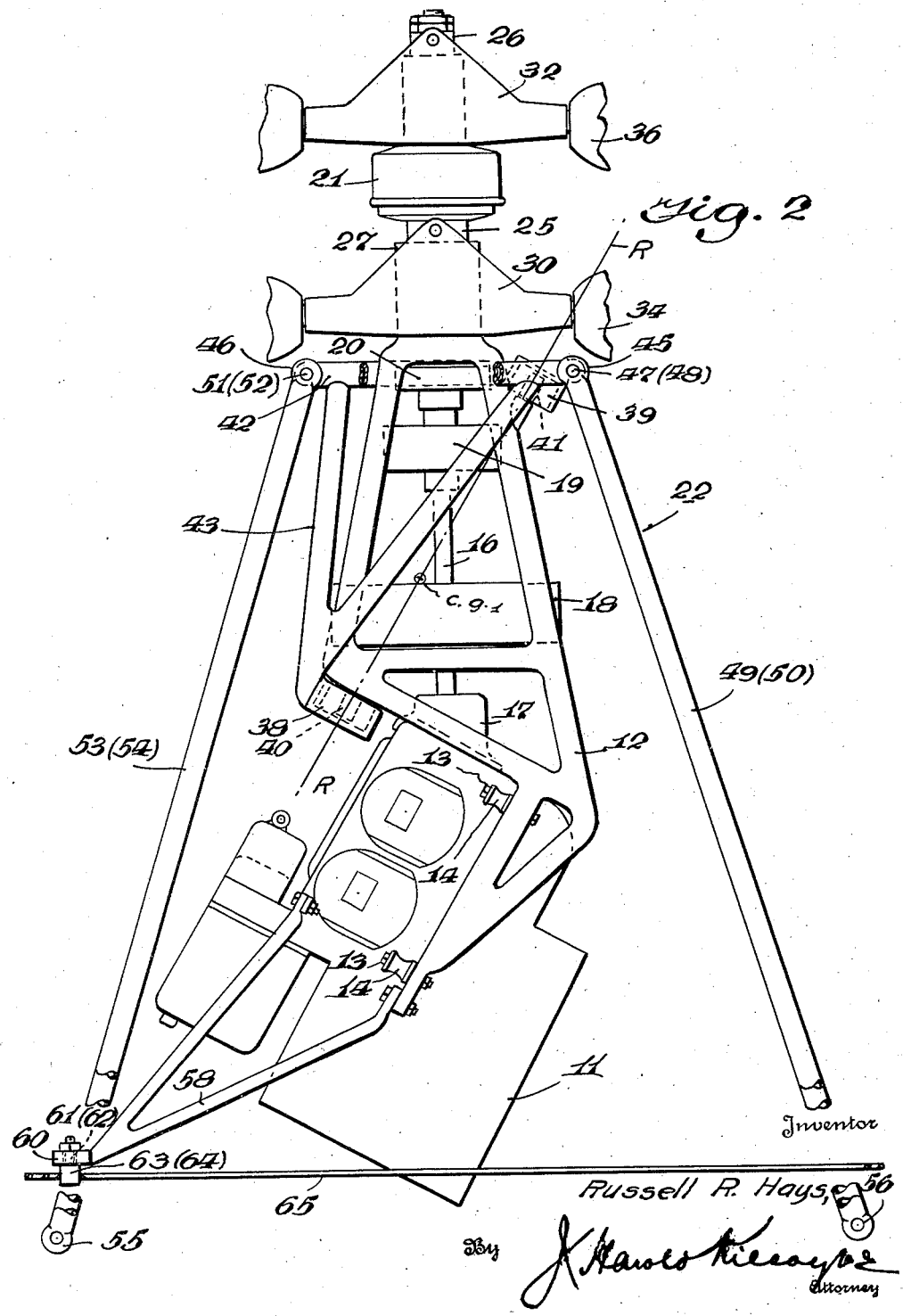

Inventor
Russell R. Hays

Patented Apr. 1, 1947

2,418,407

UNITED STATES PATENT OFFICE 2,418,407

CONTROL MEANS FOR HELICOPTERS

Russell R. Hays, Lawrence, Kans.

Application August 14, 1943, Serial No. 498,642

14 Claims. (Cl. 244—17)

This invention relates to control means for helicopters and more particularly to the mounting of the power unit of a helicopteral system for relative movement providing a direct control for the lifting propellers of the unit.

As with any direct control means for helicopters, the result of such movement is to tilt the thrust line of the propellers thereby giving a horizontal component of the thrust which is available to produce movement of the system. Tilting of the thrust line of the lifting propellers as a control means for helicopters is well known, the distinction between helicopter types being based largely on the manner by which such tilting is obtained. Thus, with a sectional control, the relative tilting occurs at the rotor hub. Where outboard propellers or panels are used as a control means the system as a whole is tilted. According to the present invention, the lifting propellers and engine are tilted as a unit relative to the remainder of the machine to provide a direct control for the propellers.

In the latter type of control, the point of pivoting of the propeller-engine unit becomes all-important, since any tilting must of necessity be associated with displacement of the mass of the machine when pivots such as have been proposed heretofore are employed. It evolves, therefore, that the principal problem is not that of tilting the thrust line of the propellers to obtain directional control, but rather is one of circumventing unbalance of the system as a result of thrust and gravity forces being disaligned through movement of the propeller-engine unit. When it is considered that the propeller-engine unit will likely include drive shafts, speed reduction gearing, blower, clutch, and like appurtenances, the weight of which will comprise in the neighborhood of fifty percent the total weight of a helicopteral system, it is seen that a comparatively small displacement of this mass may well result in rather large displacements of either the thrust line, or the fuselage of the machine, or of both.

Since the center of thrust of lifting propellers and the center of mass of the propeller-engine unit are not likely to coincide in helicopter designs now contemplated, it follows that a definite linear distance exists between these two points. And, in the case of the better known types of full-scale helicopters now in operation, this distance has had considerable magnitude. Therefore the question arises as to whether tilting may be achieved most advantageously with placement of the tilting pivots down on the unit's center of mass or up adjacent the propellers' center of thrust. Even more to the point is the question of whether an effective direct control as heretofore proposed to be obtained through tilting of such a unit on pivots transverse to the thrust line can actually be achieved.

Taking the case of a propeller-engine unit mounted on a pivot transverse to the thrust line and adjacent to the center of thrust, it is plain that because of the center of mass of the unit lying well below the pivot, tilting of the thrust line relative to the rest of the machine has the direct effect of swinging the unit's center of mass opposite to the direction of tilt. Because the unit's weight is a substantial portion of the weight of the machine as a whole, it follows that the system's C. G. has also moved in a direction opposed to the tilt. Since the dominant forces effective upon the system are those of lift tending to sustain it and acting through the propellers' center of thrust, and of gravity acting through the system's center of gravity, it follows also that tilting of the thrust line has also acted to disalign these dominant forces, with the result that a strong couple is set up tending to realign them. In brief, tilting of the propellers' thrust line is accompanied by tilting of the fuselage in the opposite direction.

If the transverse pivot of the unit now be placed so as to pass through the unit's center of mass and in a plane transverse to the thrust line, this movement of the fuselage becomes even more pronounced. And, in the case of the center of mass of the unit coinciding with the C. G. of the system, it is apparent that tilting of the thrust line cannot be achieved without the use of auxiliary surfaces, if at all.

With these known proposals of pivoting eliminated as having little likelihood of proving practical in actual application, their analysis reveals two general lines of approach to the solution of the problem. In the first place, if the unit be tilted about its center of mass, yet at the same time this pivot substantially coincides with the propellers' center of thrust, then no mass displacement will occur and the immediate effect will be one of tilting of the thrust to provide directional control. Since the center of mass of the unit and the center of thrust of the propellers' are assumed to be some distance apart, the only way in which this may be achieved is through the use of a pivot axis canted relative to the propellers' thrust line and used in conjunction with an arrangement of parts in which the mass of the unit is offset to the thrust line. Secondly, such simultaneous movement of both the center of thrust and of the center of mass of the unit is contemplated that no tilting of the fuselage is associated with tilting of the thrust line to obtain directional control.

Since either of such balanced methods of movement of a propeller-engine unit to provide tilting of the propellers' thrust line, is most effective when used to provide tilting in only one plane, it follows that if the mounting of the unit incorporates both methods and in such arrangement that their direction of action be transverse to each other, then a practical directional control can be achieved.

Accordingly, the object of this invention is broadly the provision of a mounting for a propeller-engine unit of a helicopteral system through which the propellers' thrust line may be simultaneously tilted either fore and aft or from side to side without setting up forces tending to disalign the fuselage of the system from its initial position.

Another object is the provision of a direct control mechanism for a helicopteral system in which a propeller-engine unit is mounted for movement relative to the remainder of the system, and in which fore and aft travel of the unit's center of mass is associated with fore and aft travel of its center of thrust in such relative degree that the mass forces effective upon the system as a whole are always substantially in vertical alignment with the lift of the propellers.

Yet another object is the provision of a mounting for the propeller-engine unit of a helicopter, which provides for tilting of the unit on aligned pivots the axis of which is canted relative to and passes through the thrust line of the propellers and also substantially intersects the center of mass of the unit which is offset relative to the propellers' thrust line.

Still another object of the invention is the provision of a helicopter control incorporating a pylon structure in which the legs are yieldably mounted to the pylon head and to the fuselage of the machine upon parallel axes normally transverse to the longitudinal axis of the fuselage, and in which the pylon head carries a framework upon which is mounted a propeller-engine unit which may be simultaneously moved and tilted by a predetermined degree thru yielding of the pylon structure about the axes of the bearings in which the legs are mounted.

A further object of the invention resides in the provision of a variable pylon structure for mounting an engine-propeller unit in which relative fore and aft movement of the unit is used only for tilting the thrust line of the propellers and hence can be utilized to change the flight condition of the system.

Ancillary objectives such as a simple means for controlling the degree of movement of the engine-propeller unit in order that the pilot may maintain control of the machine, the arrangement of parts to obtain placement of the unit's center of mass substantially on a canted pivot axis through the center of thrust, and the like will become clearer from reading the following description in conjunction with the accompanying drawings in which:

Fig. 1 is a side elevation showing the propeller-engine unit mounted in a variable pylon structure according to the invention, in relation to the rest of a helicopteral system, including the control members operated by the pilot.

Fig. 2 is an enlarged side elevation of the propeller-engine unit and variable pylon structure as illustrated in Fig. 1.

Fig. 3 is a more or less diagrammatic view of the cable control system by which relative movement of the propeller-engine unit is obtained.

Fig. 4 is a diagrammatic view taken generally along the line 4—4 of Fig. 1 showing the manner in which the control cables are fixed to a conventional aircraft control member.

Figure 5:
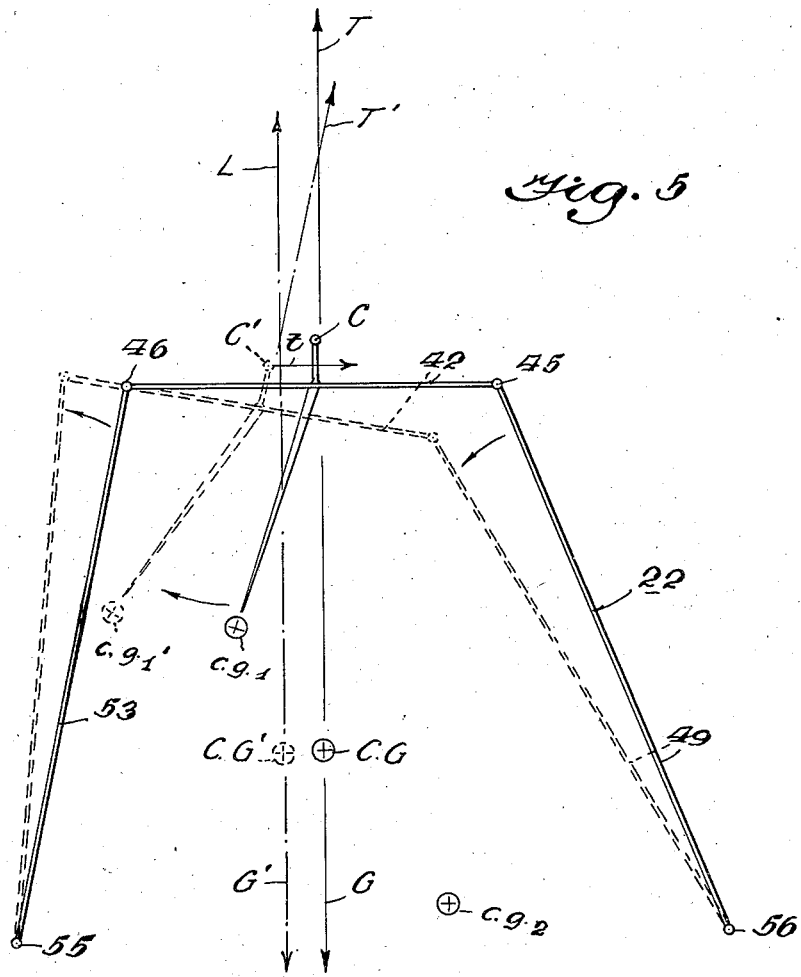
Figure 6:
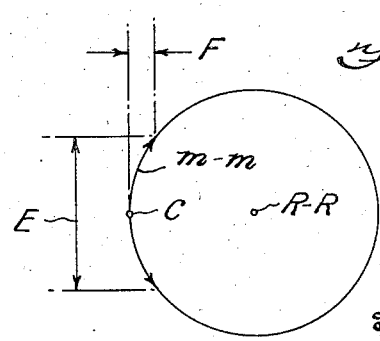

Fig. 5 is a schematic view in side elevation of a variable pylon structure according to the invention, which illustrates the manner in which tilting of the thrust line of the propellers is accompanied by simultaneous movement of both the center of thrust and the center of mass of the propeller-engine unit; and Fig. 6 is a schematic view in plan form taken generally along the line 6—6 of Fig. 1 showing the small pitching moment accompanying the rolling moments when lateral control is maintained through rotation of the engine-propeller unit about a canted axis.

Referring to the drawings wherein like reference characters designate like parts throughout the several views, reference character 10 designates the fuselage of a helicopter-type aircraft powered by an engine 11 of a type suited for vertical mounting, the engine being fixed in a tubular frame 12 of open construction by means of bolts 13 which secure the frame to engine mounting brackets 14, Fig. 2. On the forward face of the engine crank-case is a gear-case 17 carrying gears (not shown) adapted to change the direction of the driveshaft 16, so that the engine 11 is offset relative to the shaft 16 and hence to the thrust of oppositely turning, coaxial propellers 34, 36 driven by the shaft and mounted in alignment with it. A blower 18 for cooling the engine is shown as mounted on the shaft 16 immediately above the gear-case 17, the shaft 16 extending upwardly thereof and through a clutch 19 and brake 20 disposed in the sub-pylon structure and thence into the speed reduction gear box 21 positioned above the pylon, which latter is generally indicated at 22. The gear box 21 carries spaced heads 25, 26 upon which are mounted the hubs 30, 32 of the rotors 34, 36, respectively. The upper end of the frame 12 may be formed cylindrical as at 27 to provide a bearing sleeve containing supporting bearings for the driveshaft 16. Preferably, the reducing gear contained in the gear box 21, and the elements 18, 19 and 20 connected in the drive between the engine 11 and the rotors 34, 36 are of the type and arrangement disclosed in my copending application, entitled "Helicopters," Serial No. 496,917, filed July 31, 1943.

The tubular frame 12 accordingly supports the engine and propellers as a unit and is mounted on the aligned bearings 38, 39. The bearing 38 is carried relatively behind and below the frame proper and bearing 39 is carried in front and at its top, so that the axis R—R of these bearings lies in a vertical plane containing the longitudinal axis of the fuselage and is canted in this plane at approximately 30° to the axis of the driveshaft 16 which it intersects. Moreover, the height of the axis R—R, i. e., the spacing between the bearings, is such that the center of mass C. G.₁ of the propeller-engine unit mounted in the frame 12 lies substantially on it.

The bearings 38, 39 carried by the frame 12 are mounted in trunnions 40, 41, respectively, carried by the pylon head 42 and a rearwardly depending extension 43 thereof with such clearances that the frame 12 may be rocked about the axis R—R through an angle of about 15° plus or minus from its normal or midposition. The pylon head 42 is in turn carried by front and rear pylon legs, of which the two front legs 49, 50 are connected to the head through trunnions 47, 48, respectively, formed at the forward end of the head and which turn in horizontal leg bearings 45; the two rear pylon legs 53, 54 being connected by trunnions 51, 52, respectively, formed at the rear end of the head and turning in leg bearings 46. The lower ends of each side pair of pylon legs are mounted on bearings 55, 56 carried by the fuselage 10 of the machine. All four pylon bearings 45, 46, 55 and 56 are horizontal and parallel so that the pylon is symmetrically disposed in relation to them when in an upright position normal to hovering flight. It becomes evident that the pylon structure is capable of yielding in the vertical plane containing the pivot axis R—R, and in this plane alone, and that the propeller-engine unit is carried by the pylon head and has pendular position relative thereto.

In order to provide restraint of and to control such yielding movement, the engine crank-case has bolted to it a tubular extension frame 58 which extends downwardly and rearwardly and inclines relatively inwardly so as to intersect the axis R—R. The extension frame is provided also with lateral arms 60 extending from such point of intersection, the arms carrying symmetrically disposed trunnions 61, 62, respectively, in which are mounted swivels 63, 64, respectively, to each of which is fixed a side section or stretch of an endless control cable 65, Fig. 3. Opposite extensions of the cable 65 are aligned tangentially to the arc prescribed by movement of the swivels 63, 64 by being looped over and under, respectively, the pulleys 67, 69, and 68, 70 of the side pairs thereof carried by the fuselage 10. Forwardly extending loops of the endless cable 65 are cooperated with the control column 80 mounted on bearings 81 carried by the fuselage in a conventional manner. Thus, at the lower end of the column 80 the horizontal loop of the cable 65 passes over a horizontal grooved wheel 73 carried on the column pin 74, Fig. 4. At the upper end of the control column the cable 65 forms a vertical loop in passing under pulleys 71, 72 carried by symmetrical column arms 76 equidistant from the column rocking axis X—X with the wheel 73, and thence upwardly over a grooved wheel 75 turning with a rolling moment control wheel 77. The cable is fixed to the wheel 73 at a point Y so that turning of the wheel 77 acts to turn the entire propeller-engine unit about the axis R—R, while relative fore and aft movement of the control column 80 imparts fore and aft movement to the unit through the pylon structure in manner as to produce relative tilting of the propeller thrust line T.

The operation of the control will be clarified by considering rolling and pitching moments separately. The latter are derived in the illustrated embodiment through relative fore and aft movement of the pylon structure as indicated schematically in Fig. 5. Since in the side elevation a typical pylon structure is in the form of a trapezoid, it follows that any flexing of the structure, from the substantially upright position in which it is normally maintained by the thrust action of the propellers, through movement about the parallel axes 45, 46, 55 and 56 and in a plane transverse to these axes, will act to tilt the pylon head 42 out of parallelism with the base line containing the axes 55 and 56. As the thrust line T of propellers mounted in the pylon as an element of the propeller-engine unit is relatively fixed at right angles to the pylon head 42, tilting of the latter is associated directly with tilting of the thrust line T. Supplementary to this tilting, moreover, is the fact that the propellers' center of thrust C moves rearwardly with forward tilting of the thrust T; and that the center of mass C. G.₁ of the unit because of its pendular position relative to the pylon plate, moves even more rearwardly. The net result of this simultaneous movement is therefore three fold.

That the thrust line T is tilted from the vertical and now has a forward propulsive component (t) is self-evident. Equally important is that the center of gravity C. G. of the entire system has now shifted rearwardly so that it lies in vertical alignment with the center of thrust C. The reason therefor is that the total mass of the machine is comprised of two parts; one, the C. G.₁ of the propeller-engine unit, and two, the C. G.₂ which is the center of mass of the remainder of the machine. Thus, the true C. G. of the entire system at any instant is the sum of these two masses and is effective through a point lying between them. Thus if these subordinate bodies be moved relative to one another, which is what occurs with tilting of the pylon structure, it follows that movement of the C. G. of the entire system and relative to either must also occur.

This is illustrated in Fig. 5 where the point C has moved rearwardly and downwardly to the position C'. At the same time C. G.₁ has swung back to the position C. G.₁'. As a result of the latter movement, the C. G. of the entire system has shifted to the position C. G.' where it is now substantially in alignment with the vertical component L of the thrust T and closer to the point C.' The determination of the included angles of the trapezoid is a comparatively simple one when the distance of the C. G.₁ of the propeller-engine unit below the pylon head 42, and the position of the C. G.₂ of the fuselage are known. While with extreme angles of pylon tilt this relationship does not hold precisely, nevertheless within the range of normal rotor tilt, this being in the neighborhood of 10° plus or minus, the deviation is so small as to give rise to no mass displacement problems.

In obtaining rolling moments for lateral control, the operation of the control is structurally simplified. Since the center of mass C. G.₁ of the propeller-engine unit lies substantially on the axis R—R, it follows that turning or rocking of the unit about this axis gives rise to no displacement of the center of mass C. G. of the entire system. While theoretically the axis R—R should intersect the center of thrust C, which is not particularly difficult to do structurally, any small deviations due to the offset position of the point C do not greatly detract from the operation of the control, and are more than compensated by the structural simplicity thus obtained. The effectiveness of action of such a control, in short, results from the thrust line T describing a cone of rotation about the axis R—R, Fig. 6. Hence, since the longitudinal component F of the lateral movement E accompanying movement of the propeller-engine unit through the relatively small arc m—m required to maintain lateral control is exceedingly small it also may be disregarded in elementary control computations.

While the foregoing description has treated the mounting of an engine-propeller unit in a variable pylon so as to provide only a direct control means, it will be obvious to those skilled in the art that it may also be utilized to tilt the rotor for translational travel in systems using a sectional control for greater sensitivity during hovering flight. It is to be understood also that the cable controls shown may be replaced by hydraulic levers and the like without departure from the principles described. Thus, as many changes could be made in carrying out the above constructions and in achieving the objects thereof, it is intended that all matter contained in the above description or shown in the accompanying drawings shall be interpreted as illustrative and not in a limiting sense.

I claim:

1. Control means for helicopters, comprising, in combination with a fuselage, a propeller-engine unit therefor, a pylon structure including a head and a plurality of legs, said legs being mounted for turning movement relative to the fuselage and the head on parallel axes which are transverse to the longitudinal axis of the fuselage whereby the pylon structure is yieldable in fore and aft direction, means mounting said unit from the head, and means for causing said pylon structure to yield by a predetermined degree whereby to controllably tilt said unit in fore and aft direction.

2. Control means for helicopters comprising, in combination with a fuselage, a propeller-engine unit therefor, a pylon structure including a head and a plurality of legs, said legs being mounted for turning movement relative to the fuselage and the head on parallel axes which are transverse to the longitudinal axis of the fuselage whereby the pylon structure is yieldable in fore and aft direction, a frame fixed to said unit, the frame being suspended from the pylon head and being mounted to tilt relative to said head about an axis lying in the vertical plane containing said fuselage axis and which is canted to the axis of the driveshaft of the unit which it intersects, and means for causing the pylon structure to yield and said frame to tilt relative to the head by a predetermined degree whereby to controllably tilt the unit in fore and aft direction and from side to side of its normal position.

3. Control means for helicopters as set forth in claim 1, wherein fore and aft travel of the center of mass of the unit resulting from fore and aft movement of the unit is associated with fore and aft travel of the propeller's center of thrust in such relative degree that the mass forces effective on the system as a whole are always substantially in vertical alignment with the lift of the propeller.

4. Control means for helicopters comprising, in combination with a fuselage, a propeller-engine unit therefor, a pylon structure including a head and a plurality of legs, said legs being mounted for turning movement relative to the fuselage and the head on parallel axes which are transverse to the longitudinal axis of the fuselage whereby the pylon structure is yieldable in fore and aft direction, means mounting said unit from the head, and means restraining free yielding of the pylon and being operative to effect a controlled yielding of the pylon whereby to tilt the unit in fore and aft direction by a predetermined degree.

5. Control means for helicopters comprising, in combination with a fuselage, a propeller-engine unit therefor, a pylon structure including a head and a plurality of legs, said legs being mounted for turning movement relative to the fuselage and the head on parallel axes which are transverse to the longitudinal axis of the fuselage whereby the pylon structure is yieldable in fore and aft direction, a frame fixed to said unit, the frame being suspended from the pylon head and being mounted to tilt relative to said head about an axis lying in the vertical plane containing said fuselage axis and which is canted to the axis of the driveshaft of the unit which it intersects, and means for restraining free yielding of the pylon and tilting of the frame relative to pylon head yet being operative to effect controlled yielding of the pylon and tilting of the frame.

6. Control means for helicopters comprising, in combination with a fuselage, an engine-propeller unit therefor having its center of gravity lying below the center of thrust of the propeller and rearwardly of the center of gravity of the helicopter, means mounting said unit from said fuselage both for fore and aft movement relative to said fuselage and for rocking movement relative to said fuselage about an axis which is canted relative to and substantially intersects the thrust line of the propeller and which substantially contains the center of gravity of the unit, and means whereby fore and aft movement of the unit in one direction effects opposite displacement of the center of thrust of the propeller and a corresponding displacement of the center of gravity of the helicopter into substantial vertical alignment therewith, the construction and disposition of said mounting means being such that rocking movement of the unit about said axis as aforesaid effects no substantial displacement of the helicopter's center of gravity.

7. Control means for helicopters as set forth in claim 6, wherein the means are provided for causing tilting and rocking of the unit, said last means including a control column carried in the fuselage and operating connections between the column and unit permitting the tilting and rocking movements to be selectively and simultaneously applied.

8. Control means for helicopters comprising, in combination with a fuselage, an engine-propeller unit therefor, and means mounting said unit from said fuselage and for rocking movement relative thereto about an axis which is canted relative to and substantially intersects the thrust line of the propeller and which substantially contains the center of gravity of the unit, said mounting means being operative to permit rocking of the unit about said axis as aforesaid without effecting any substantial displacement of the center of gravity of the helicopter.

9. Control means for helicopters comprising, in combination with a fuselage, an engine-propeller unit therefor, and means for mounting said unit on said fuselage for rocking movement laterally of the longitudinal center line of the fuselage, said means providing a rocking axis lying in the vertical plane containing said center line and which is canted relative to and substantially intersects the thrust line of the propeller and which substantially contains the center of gravity of the unit, said means being operative to permit rocking of the unit about said axis as aforesaid without effecting any substantial displacement of the center of gravity of the helicopter.

10. Control means for helicopters comprising, in combination with an engine-propeller unit, yieldable means mounted on said unit and suspending a horizontally disposed fuselage therefrom, the center of gravity of said unit lying below the center of thrust of said unit, and means varying the shape of said yieldable means so as to effect tilting of the thrust line of said unit simultaneously with travel of said center of gravity and said center of thrust oppositely to the direction of said tilting and by different degree, whereby said fuselage is maintained in its initial horizontal position.

11. Control means for helicopters comprising, in combination with an engine-propeller unit, yieldable means mounted on said unit and suspending a horizontally disposed fuselage therefrom, the center of gravity of said unit lying below the center of thrust of said unit, and means varying the shape of said yieldable means so as to effect tilting of the thrust line of said unit simultaneously with travel of said center of gravity and said center of thrust oppositely to the direction of said tilting, the vertical displacement of said center of gravity being greater than the vertical displacement of said center of thrust, whereby said fuselage is maintained in its initial horizontal position.

12. Control means for helicopters comprising, in combination with an engine-propeller unit, yieldable means mounted on said unit and suspending a horizontally disposed fuselage therefrom, the center of gravity of said unit lying below the center of thrust of said unit, and means varying the shape of said yieldable means so as to effect tilting of the thrust line of said unit simultaneously with travel of said center of gravity and said center of thrust oppositely to the direction of said tilting, the vertical displacement of said center of gravity being greater than the vertical displacement of said center of thrust, and the horizontal displacement of said center of thrust being downward with respect to its initial position when the direction of thrust is vertical, whereby with release of the control means the weight of said horizontally disposed fuselage sets up a moment tending to return said center of thrust to its initial vertical position.

13. Control means for helicopters comprising, in combination with an engine-propeller unit, yieldable means mounted on said unit and suspending a horizontally disposed fuselage therefrom, said yieldable means including a pivot lying in a vertical plane containing the longitudinal axis of said fuselage, and being canted with respect to the horizontal to pass substantially through the center of gravity of said unit, whereby said unit may be rotated about said pivot to produce lateral tilting of the thrust of said unit.

14. Control means for helicopters comprising, in combination with a fuselage, an engine-propeller unit therefor having its center of gravity lying below the center of thrust of the propeller and rearwardly of the center of gravity of the helicopter, a framework of trapezoidal form as viewed in side elevation mounted from said fuselage and disposed intermediate the unit and fuselage, said framework being yieldable in fore and aft direction and being normally maintained substantially upright by the lift action of the propeller, means for causing said framework to yield as aforesaid including a control column carried by the fuselage, and means mounting said unit from said framework in such manner that yielding of the frame tends to cause relative movement of the center of thrust of the propeller and the center of gravity of the helicopter towards one another.

RUSSELL R. HAYS.

REFERENCES CITED

The following references are of record in the file of this patent:

UNITED STATES PATENTS

| Number | Name | Date |
|---|---|---|
| 2,004,310 | Clausen | June 11, 1935 |
| 2,037,745 | Vaughn | Apr. 21, 1936 |
| 2,156,334 | De Bothezat | May 2, 1939 |
| 2,163,728 | Dyer et al. | June 27, 1939 |

Disclaimer 2,418,407.—*Russell R. Hays*, Lawrence, Kans. CONTROL MEANS FOR HELICOPTERS. Patent dated Apr. 1, 1947. Disclaimer filed Nov. 28, 1950, by the inventor.
    Hereby enters this disclaimer to claims 1, 4, and 10 of said patent.
    [*Official Gazette January 2, 1951.*]